US006187128B1

(12) United States Patent
Oosterlinck

(10) Patent No.: US 6,187,128 B1
(45) Date of Patent: Feb. 13, 2001

(54) APPARATUS AND METHOD FOR CONVERTING AND APPLYING LABELS

(75) Inventor: Marc F. Oosterlinck, Upland, CA (US)

(73) Assignee: CCL Label Inc., Sioux Falls, SD (US)

( * ) Notice: Under 35 U.S.C. 154(b), the term of this patent shall be extended for 0 days.

(21) Appl. No.: 09/009,992

(22) Filed: Jan. 21, 1998

(51) Int. Cl.[7] ...................................................... B32B 31/00
(52) U.S. Cl. ........................... 156/249; 156/382; 156/152
(58) Field of Search ..................................... 156/152, 247, 156/249, 264, 265, 382

(56) References Cited

U.S. PATENT DOCUMENTS

| | | | | |
|---|---|---|---|---|
| 2,608,503 | * | 8/1952 | Meyer | 156/152 |
| 3,574,026 | | 4/1971 | Kucheck | 156/152 |
| 3,684,603 | * | 8/1972 | Iltis | 156/152 |
| 4,512,845 | * | 4/1985 | Köbler | 156/548 |
| 4,927,588 | * | 5/1990 | Schultz | 264/258 |
| 4,959,118 | * | 9/1990 | Herbin et al. | 156/512 |
| 5,045,139 | * | 9/1991 | Vonk | 156/152 |
| 5,219,183 | | 6/1993 | McKillip | 283/62 |
| 5,624,520 | * | 4/1997 | Nedblake et al. | 156/249 |

FOREIGN PATENT DOCUMENTS

| | | |
|---|---|---|
| 1248412 | 1/1989 | (CA) . |
| WO 9005089 | 5/1990 | (WO) . |
| WO 94/14605 | 7/1994 | (WO) . |

* cited by examiner

*Primary Examiner*—Francis J. Lorin
(74) *Attorney, Agent, or Firm*—Warner Norcross & Judd LLP

(57) ABSTRACT

A labeling apparatus for converting base label stock to releasably-lined labels. The apparatus includes a vacuum anvil roller and an idler roller which cooperate to separate the base stock into its face web and backing liner components. A cutting roller cooperates with the vacuum anvil roller to butt cut the unlined face web to form butt cut labels. A traction nip roller cooperates with the vacuum anvil roller to press the butt cut labels to the backing liner to form the releasably-lined labels. The releasably-lined labels may be imprinted and the backing liner removed as the label is affixed to an article using conventional labeling equipment. A rewind nip roller cooperates with the traction nip roller to pull the backing liner, which is then rolled on a rewind mandril. The apparatus does not weaken or cut the backing liner during conversion to releasably-lined labels, because the butt cut is made after the face web is separated from the backing liner.

19 Claims, 1 Drawing Sheet

APPARATUS AND METHOD FOR CONVERTING AND APPLYING LABELS

BACKGROUND OF THE INVENTION

The present invention relates to label converting and application, and more particularly to an apparatus and method for converting label base stock to a roll of releasably backed labels.

Self-adhesive or pressure-sensitive labels are used in a wide variety of applications for labeling bottles, jars, and other containers and articles. The label application equipment operates at high speeds resulting in thousands of labeled articles per hour. The label manufacture and application typically fall into two broad techniques, depending on whether the label stock is converted into labels during manufacture of the labels (and therefore well prior to application) or as part of the application process.

In the first technique, the labels are individually formed on a continuous web (also known as a release liner) prior to their use in the application equipment. In this case, the release liner is pulled through the machine, and the labels are transferred from the release liner to the articles to be labeled. The application equipment draws the release liner about a peel edge adjacent the article to be labeled. Because the label is stiffer than the release liner, the label continues in a straight line past the peel edge and onto the article. This first technique involves sophisticated label manufacture, but straightforward label application. Consequently, the application equipment and processes are relatively simple, inexpensive, and reliable.

In the second technique, the labels are cut from a continuous web of label stock at or adjacent the application equipment. In this case, the face web is severed into discrete labels. The cut labels are applied to the articles as quickly as they are cut. The second technique involves straightforward label manufacture but sophisticated label application. Consequently, the application equipment is less simple, more expensive, and less reliable.

In this second technique, the labels can be cut either before or after the face web is separated from the liner. "Butt cut" is a term describing a label cut that severs the web transversely from edge to edge to form individual labels from the face web without the disadvantage of creating a waste label skeleton or matrix associated with "die cuts," which are discussed below. If cutting occurs before the face web is separated from the release web, a butt cut knife blade cuts deeply enough to sever both the face web and pressure sensitive adhesive layer on its back—without penetrating the release liner. This requires precision cutting that is difficult to maintain in actual use conditions. If the cut is too deep, then the backing liner may be weakened to the point that the backing liner breaks as it is pulled through automated label application machinery. This causes expensive downtime and wasted material. If the butt cut is not deep enough, then the label will not cleanly separate during application. Further, the operator must randomly inspect the labels after the cuts have been made to determine whether the cut is deep enough.

Alternatively, the face web may be cut when it is not attached to the release liner—either because the equipment separates the face web from the release liner or because the label stock is "linerless" (meaning that it never included a liner). An example of this approach is illustrated in International Patent Application No. WO 90/05089 entitled "Improvements Relating to the Application of Labels to Articles" published May 17, 1990, which describes a label applicator that makes and applies butt cut labels without the use of a backing liner. The vacuum chamber provides the suction to hold the butt cut label until the conveyor belt transfers it to the applicator station, where a roller and belt apply the label to the article. (International Application at pages 9–11.) Because the butt cut label lacks a backing liner, this apparatus requires an elaborate means—comprising parallel conveying belts supported by guide rollers and channels with a vacuum chamber between the guide rollers—to hold the butt cut label during application. (International Application, FIG. 2.)

In contrast to a butt cut, a "die cut" is a label cut made by a patterned cutting blade that severs the web to form a label having a desired configuration, leaving a skeleton or matrix waste of face web material. If the base stock does not include a backing liner, then the die cut skeletal waste of the face web provides the means for pulling the face web through the automated labeling equipment. See, for example, Canadian Patent 1,248,412 entitled "Self Adhesive Labels and the Manufacture Thereof" issued Jan. 10, 1989 (page 16 and FIG. 7).

The previously cited International Patent Application No. WO 90/05089 at page 2 also discloses the application of die cut labels to articles. A cutting drum and anvil cooperate to die cut labels from a continuously fed base stock having a pressure sensitive adhesive coating on one side. Each label, after being cut from the web, is held to the anvil by a vacuum until the label reaches the application station, where the label is released and applied to the article. The face web is pulled through the labeling machine by the skeletal face web waste formed by the die cut.

SUMMARY OF THE INVENTION

The aforementioned problems are overcome in the present invention wherein an apparatus converts base stock to releasably-lined labels by separating the face web and the backing liner, cutting a label from the face web, and pressing the cut label back onto the backing liner to form the releasably-lined label.

As disclosed, a butt cut is made to form the label. Alternatively, the labels may be die cut, in which case the waste matrix must be collected.

In one embodiment of the invention, a labeling applicator is located downstream of the label cutting and pressing operations. The liner-backed labels are pulled through the labeling applicator by the backing liner.

The label apparatus and method of the invention have several advantages. First, because the face web and backing liner are separated prior to the cut, the label cut is made through the face web without the possibility of cutting the backing liner. The cutting blade can sever the pressure sensitive adhesive-coating and the face web to engage the anvil roller to form a clean, complete, and reliable label cut. Further, since the backing liner is removed prior to the cutting operation, there is no need to inspect the subsequent cut to assure that the face sheet and pressure sensitive adhesive coating have been completely severed—or that the backing liner has not been cut or weakened. Second, because the backing liner is not cut or weakened during the conversion of base stock to back-lined labels, the invention reduces the downtime and waste caused when the backing liner of prior art labels break as the back-lined labels are pulled through label applicators. Third, the label applicator equipment can be located immediately downstream of the cutting operation so that the pressure sensitive adhesive will not bleed across the cut to cause more difficult label separation during application. Fourth, the invention eliminates the need to use sensor marks on butt cut labels; sensor marks are required to use prior art butt cut labels with many conventional application equipment. Fifth, base stock manufacturers can continuously convert the base stock to rolls of liner-backed labels that can be stored until use by the customer, who can feed the converted roll directly to conventional label application equipment without further processing.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
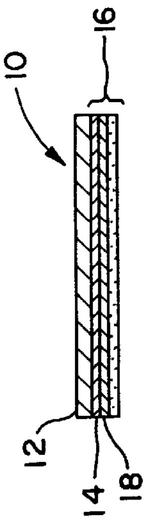
FIG. 1 (PRIOR ART)
FIG. 1 is a cross-section side view of prior art label base stock.

As shown in FIG. 1, conventional label base stock 10 includes a face web 12 (also known as "label web" or "base web") and a backing liner 16. The face web 12 has a pressure sensitive adhesive layer 14 adhered to its rear surface. The backing liner 16 has a release agent coating 18, such as a silicone release material, on its front side adjacent to the pressure sensitive adhesive layer 14 of face web 12.

The backing liner 16 can serve two functions. First, the backing liner prevents the pressure sensitive adhesive layer 14 from adhering to the front side of the face web 12 when the label base stock material is in a roll. However, this first function can be met without the backing liner if a release agent is applied to the front side of the face web, as is known in the art. Further, in applications where the backing liner serves only this first function, the backing liner can be peeled off and discarded prior to processing the face web.

The second function of the backing liner is to provide a means by which the label base stock 10 can be pulled through automated labeling equipment. In this second function, the backing liner is essential to enable the use of many existing types of automated label applicators—especially when the base stock has been converted to butt cut labels.

Figure 2:
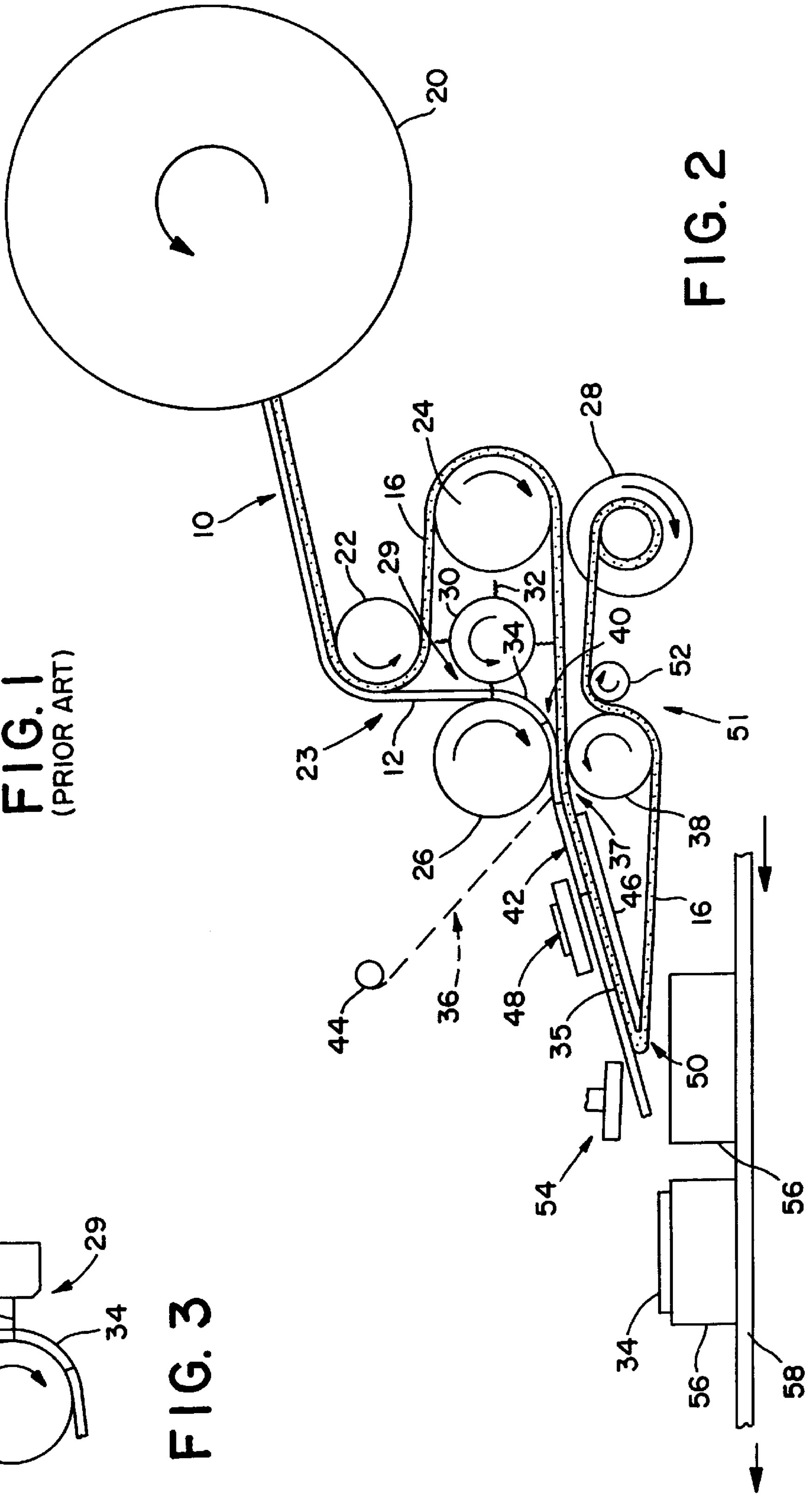
FIG. 2 is a diagrammatic view illustrating the apparatus for cutting and applying labels according to the invention.

Referring to the drawings, FIG. 2 shows the labeling apparatus of the present invention. The base stock 10 travels to separating means 23, which separates the base stock into its face web 12 and backing liner 16 components. The face web travels to cutting means 29, which cuts labels 34 from face web 12. The labels 34 and the backing liner 16 are united at pressing means 37 to form releasably-lined labels 42. The releasably-lined labels 42 are optionally imprinted and applied to an article. After the backing liner 16 is separated from the releasably-lined labels 42, the backing liner travels to pulling means 51 and is taken up by rewind mandril 28.

I. Structure of the Labeling Apparatus

A. Base Stock

As shown in FIG. 2, unwind mandril 20 provides a rotatable mounting for the base stock feed roll (not shown) containing base stock 10. A roll of base stock is used to provide an essentially continuous supply of base stock.

As shown in FIG. 1, base stock 10 comprises face web 12 having adhesive layer 14 adhered to its rear surface and a backing liner 16 releasably attached to the face web 12 by the adhesive layer 14. Base stock constructions are well known in the art.

The face web 12 is made of a flexible material such as paper or plastic. The rear surface of face web 12 is coated with an adhesive layer 14, preferably a pressure sensitive adhesive. As is known in the art, the pressure sensitive adhesive is selected according to the intended end use of the label by considering, for example, the length of time the label is intended to be affixed to an article and the temperature or other environmental conditions to which the label will be exposed.

The backing liner 16 includes a flexible base material such as paper or plastic and a coating layer 18 of release agent or material covering its front surface. The release material 18 may be a silicone coating or other material (e.g., PTFE varnish) or other substances that allow the backing liner 16 to release from the face web 12.

The base web 10 is fed from the unwind mandril 20 over guide roller 22, which is positioned to manage the base stock 10 as it unwinds from the feed roll. Other web handling equipment may be utilized to facilitate the web management, as is known in the art. See, for example, International Patent Application No. WO 90/05089 entitled "Improvements Relating to the Application of Labels to Articles" published May 17, 1990 and Canadian Patent 1,248,412 entitled "Self Adhesive Labels and the Manufacture Thereof" issued Jan. 10, 1989, both of which are incorporated herein by reference.

B. Separating Means

Separating means 23 for separating the backing liner 16 from the face web 12 is located downstream from the unwind mandril 20. The separating means 23 can include, for example, idler roller 24 and vacuum anvil roller 26, which act in cooperation to separate the backing liner from the face web, as is explained more fully in the operation section below.

The backing liner 16 is fed from guide roller 22 over idler roller 24 so that the front, release-agent coated side of backing liner 16 engages the surface of idler roller 24. The idler roller 24 is positioned downstream relative to guide roller 22 so that the backing liner 16 forms an angle relative to the face web 12 at the guide roller 22.

The face web 12 is fed from the guide roller 22 to vacuum anvil roller 26. The vacuum anvil roller is positioned downstream relative to idler roller 22 so that the face web 12 forms an angle relative to the backing liner 16 at guide roller 22. The vacuum anvil roller creates a suction at its surface to hold face web 12 on the surface as the roller rotates. Vacuum cylinders or rollers are known in the art; see, for example, the previously cited Canadian Patent No. 1,248,412 at page 16. Face web 12 is fed so that its front or face side is against the surface of vacuum anvil roller 26 and its opposite rear side with adhesive coating 14 faces outwardly relative to vacuum roller 26.

C. Cutting Means

Cutting means 29 for cutting label 34 from face web 12 is downstream from separating means 23. Cutting means 29 can include, for example, a rotary cutter 30 cooperating with vacuum anvil roller 26 to form cuts 35 in face web 12 and thus create labels 34. Rotary cutter 30 includes at least one cutting blade 32, and preferably a plurality of cutting blades. Cutting blades 32 can be either a butt cut blade or a die cut blade, forming butt cut labels and die cut labels, respectively. If cutting blade 32 is a die cut blade, then label 34 will embody the pattern of the die cut blade; and skeleton or matrix waste 36 is formed (indicated by broken lines), as is known in the art. If cutting blade 32 is a butt cut blade, the face web 12 is transversely severed so that there is no skeleton or matrix waste formed.

Figure 3:
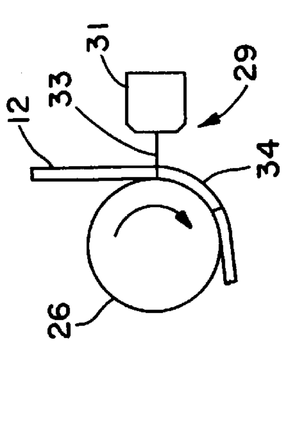
FIG. 3 is an enlarged diagrammatic view illustrating the laser cutting device cutting means.

Cutting means 29 can also include, for example, a laser cutting device 31 (FIG. 3) that emits cutting beam 33. Laser cutting devices are known to those of skill in the art. The laser 31 can be programmed to form either die or butt cuts. The anvil roller 26 can be formed of a suitable nonmetallic material as the backing surface for the laser cut formed by laser cutting device 31, as is also known in the art.

D. Pressing means

Pressing means 37 is downstream from the cutting means 29. Pressing means 37 can include, for example, pressure nip or traction nip roller 38, which cooperates with vacuum anvil roller 26 to form nip 40. Label 34 is fed from cutting roller 30 to nip 40 with the adhesively-coated rear surface of label 34 facing traction nip roller 38. Backing liner 16 is fed from idler roller 24 to nip 40 with the release-agent coated front surface of backing liner 16 facing vacuum anvil roller 26. Nip 40 is sufficiently narrow to squeeze or press label 34 and backing liner 16 together to form releasably-lined label 42. The vacuum suction provided by vacuum roller 26 ceases in the region of the nip, as is known in the art. (See, for example, the previously-cited Canadian Patent 1,248,412 at page 16 and FIG. 7.) Waste matrix 36 (formed if a die cut is used) is rewound by waste-uptake mandril 44.

E. Imprinting Means

Releasably-lined label 42 is fed from nip 40 across peel plate 46. Peel plates and their equivalents are known in the art. Imprinting means 48 is mounted relative to and in cooperation with peel plate 46 to print a design or other label information on the front surface of label 34. The imprinting means can include, for example, a thermal transfer printer, direct thermal printer, hot stamp printer, a laser printer, or other similar or equivalent printing devices.

F. Label-Affixing Means

Label-affixing means 54 for affixing label 34 to an article 56 is downstream from the imprinting means 48 or the pressing means 37. Label-affixing means 54 are known in the art, and include, for example, automated label-applicators capable of affixing pressure sensitive adhesive labels to articles 56 traveling along conveyor belt 58. Label-affixing means 54 can include or act in cooperation with peel plate 46 to separate label 34 from backing liner 16, as is known in the art. The backing liner 16 wraps around the terminal end 50 of peel plate 46.

Label-affixing means 54 can be located immediately downstream from the pressing means 37. "Immediately downstream" as used herein includes a length of time sufficiently short to minimize the bleeding of the adhesive 14 across cut 35. The bleeding or migration of adhesive increases with time after the cutting of the adhesive. Such bleeding or migration can cause operational problems during subsequent separation of the labels 34 from the backing liner 16.

G. Pulling Means

Pulling means 51 for pulling backing liner 16 is located downstream from the pressing means 37 (and downstream from the optional imprinting means 48 and the label-affixing means 54). Pulling means are known in the art, and include, for example, traction nip roller 38 cooperating with rewind nip roller 52. Backing liner 16 is pulled between the nip formed by traction nip roller 38 and rewind nip roller 52, at least one of which is powered to provide the pulling force. Backing liner 16 is taken-up or rewound by driven rewind mandril 28 to form a roll of spent backing liner.

II. Operation of the Labeling Apparatus

Base stock 10 travels from the unwind mandril over guide roller 22. Face web 12 peels or separates from backing liner 16. Face web and backing liner 16 are each pulled at an angle relative to each other. The face web 12 readily peels from the backing liner 16 because there is a much stronger bond between the pressure sensitive adhesive layer 14 and the face web 12 than between adhesive layer 14 and the backing liner 16.

After separation from the backing liner, the face web 12 travels to the vacuum anvil roller 26. The suction of the vacuum roller holds the face web on the anvil surface. The cutting blades 32 of rotary cutter 30 sever face web 12 by piercing first its adhesively-coated rear side. The blades continue inwardly toward the front side of face web 12 to engage the surface of the anvil roller 26. Thus, the blades form label 34 by making a clean, complete, and reliable cut. Label 34 then travels on the surface of the vacuum anvil roller to nip 40. If the cutting means forms die cut labels, then the skeleton or matrix waste is taken up by waste-uptake mandril 44. If laser cutting device 31 is used, the laser beam 33 performs the same function as cutting blades 32, also cutting from the adhesively-coated rear side toward the front side of face web 12 to engage the surface of anvil roller 26.

After separation from the face web, the backing liner 16 travels around idler roller 24 to engage label 34 at nip 40. Traction nip roller 38 and vacuum roller 26 cooperate to press label 34 to the backing liner to form releasably-lined labels 42. At this point, if a roll of releasably-lined labels is desired, then the releasably-lined labels can be fed to pulling means 51 and rewind mandril 28.

Alternatively, if an imprinted-labeled article is desired, the releasably-lined labels 42 can travel through imprinting means 48 and label-affixing means 54. The backing liner 16 wraps around the terminal 50 of peel plate 46 prior to entering the pulling means 51. The rewind mandril 28 takes up the spent backing liner.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents.

The embodiments of the invention in which an exclusive property or privilege is claimed are defined as follows:

1. An apparatus for converting base stock to releasably-lined butt cut labels, the base stock having a multiple layer construction of a face web, an adhesive coating on the rear surface of the face web, and a backing liner releasably attached to the adhesive coating, the apparatus comprising:

means for separating the base stock into the face web and the backing liner including a vacuum roller capable of creating suction to hold the face web on the surface of the vacuum roller as it rotates to pull the face web of the base stock at an angle relative to the backing liner;

means for cutting a label from the face web, including the vacuum roller and a cutting roller including at least one cutting blade adapted to engage the vacuum roller as the cutting roller rotates;

means for pressing the label to the backing liner including the vacuum roller capable of creating suction to hold the label cut from the face web on the surface of the vacuum roller as it rotates, and a nip roller adapted to press the backing liner against the label on the surface of the vacuum roller, whereby the label held by suction against the vacuum roller releasably adheres to the backing liner; and means for pulling the backing liner, the pulling means located downstream from the pressing means.

2. The apparatus of claim 1 wherein the cutting means is adapted to cut from the adhesive coating on the rear surface of the face web through the face web.

3. The apparatus of claim 1 further comprising means for imprinting the label, the imprinting means located downstream from the pressing means.

4. The apparatus of claim 1 further comprising means for affixing the label to an article, the affixing means located downstream from the pressing means.

5. The apparatus of claim 4 wherein the affixing means is immediately downstream from the pressing means.

6. The apparatus of claim 4 wherein the affixing means includes an automated label applicator capable of affixing pressure sensitive adhesive labels to articles.

7. The apparatus of claim 6 wherein the affixing means further includes a peel plate.

8. An apparatus for affixing releasably-lined die-cut labels to articles, the labels including a base stock having a multiple layer construction of a face web, an adhesive coating on the rear surface of the face web, and a backing liner releasably attached to the adhesive coating, the apparatus comprising:

a vacuum anvil roller capable of creating suction to hold the face web on the surface of the vacuum anvil roller as it rotates to pull the face web of the base stock at an angle relative to the backing liner;

an idler roller adapted to pull the backing liner of the base stock at an angle relative to the face web whereby the backing liner is separated from the face web;

a cutting roller having at least one cutting blade adapted to engage the vacuum anvil roller as the cutting roller rotates, whereby the face web is severed to form a die-cut label and a skeleton waste web held to the surface of the vacuum anvil roller;

a nip roller downstream from the cutting roller adapted to press the backing liner against the die-cut label on the surface of the vacuum anvil roller, whereby the die-cut label held by suction against the vacuum roller releasably adheres to the backing liner;

means for uptaking the skeletal waste web;

means downstream from the nip roller for pulling the backing liner between the nip roller and the vacuum anvil roller; and means for affixing the die cut label to an article.

9. The apparatus of claim 8 further comprising means for imprinting the label, the imprinting means located downstream from the traction roller and upstream from the pulling means.

10. The apparatus of claim 8 wherein the affixing means includes a peel plate capable of affixing pressure sensitive adhesive labels to articles.

11. The apparatus of claim 8 wherein the peel plate is immediately downstream from the pressing means.

12. An apparatus for converting label base stock to releasably-lined labels, the base stock having a multiple layer construction of a face web, an adhesive coating on the rear surface of the face web, and a backing liner releasably attached to the adhesive coating, the apparatus comprising:

a vacuum anvil roller capable of creating suction to hold the face web on the surface of the vacuum anvil roller as it rotates to pull the face web of the base stock at an angle relative to the backing liner;

an idler roller adapted to pull the backing liner of the base stock at an angle relative to the face web, whereby the face web is separated from the backing liner;

a laser cutting device adapted to emit a laser beam to engage the vacuum anvil roller, whereby the face web is cut from its adhesively-coated rear side to form a label held to the surface of the vacuum anvil roller;

a nip roller downstream from the cutting roller adapted to press the backing liner against the label on the surface of the vacuum anvil roller, whereby the label held by suction against the vacuum roller releasably adheres to the backing liner; and means downstream from the nip roller for pulling the backing liner between the nip roller and the vacuum anvil roller.

13. A method of converting base stock to releasably-lined labels, the base stock having a multiple layer construction of a face web, an adhesive coating on the rear surface of the face web, and a backing liner releasably attached to the adhesive coating, the method comprising:

separating the base stock into the backing liner and the face web;

subsequently cutting labels from the face web by providing a vacuum to hold the face web on the surface of a vacuum anvil roller, and by cutting the face web on the vacuum anvil roller with one from a rotating cutter having a cutting blade that engages the vacuum anvil roller to form a label and a laser whereby the vacuum anvil roller acts as the cutting surface for the laser; and subsequently pressing the labels to the backing liner to form the releasably-lined labels by pulling the backing liner between the vacuum anvil roller and a nip roller downstream from the rotating cutter, wherein the nip roller presses the backing liner against the label on the surface of the vacuum anvil roller.

14. The method of claim 13 wherein the cutting step includes cutting the face web from the adhesively-coated rear side through the face web.

15. The method of claim 13 wherein the cutting step forms a butt cut label.

16. The method of claim 13 wherein the cutting step forms a die cut label.

17. The method of claim 13 further comprising:

continuously pulling the backing liner from the releasably-lined labels to affix the labels to articles.

18. The method of claim 13 further comprising imprinting the label subsequent to the cutting step.

19. A method of converting labels and applying labels to articles comprising:

separating a face web from a release liner;

creating suction to hold the face web on the surface of a vacuum roller as the vacuum roller rotates to pull the face web;

butt cutting a discrete label from the face web with a cutting apparatus whereby the vacuum roller is used as a cutting surface;

creating suction to hold the discrete label butt cut from the face web on the surface of the vacuum roller as it rotates;

applying the discrete labels serially to the release liner; and applying the discrete labels on the release liner serially to articles.

* * * * *